Nov. 23, 1948.  F. G. ROSENE  2,454,407
NONSKID DEVICE
Filed May 11, 1945  3 Sheets-Sheet 1
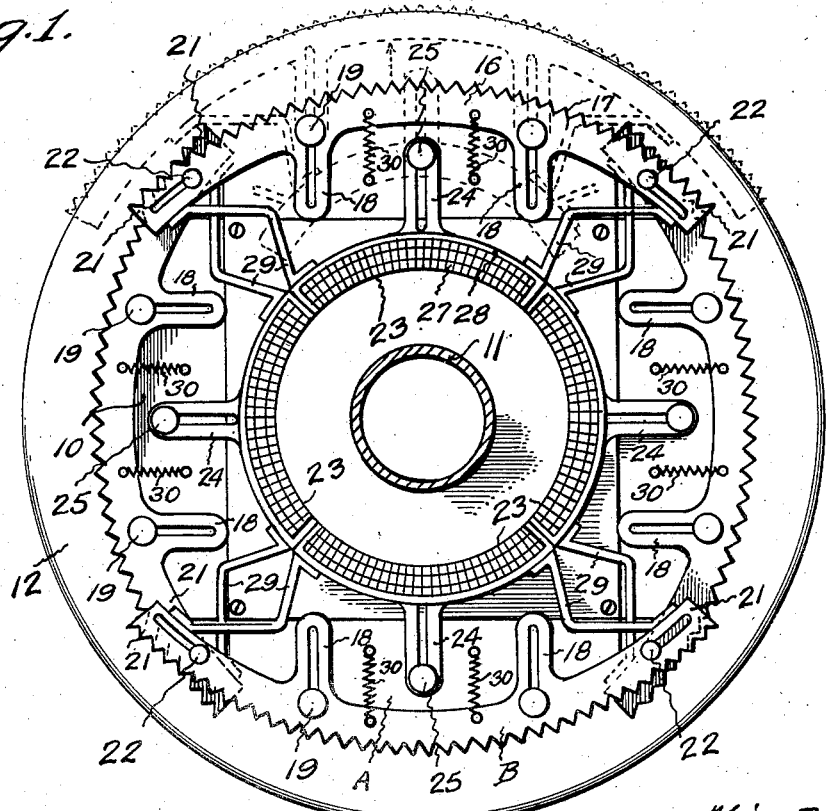
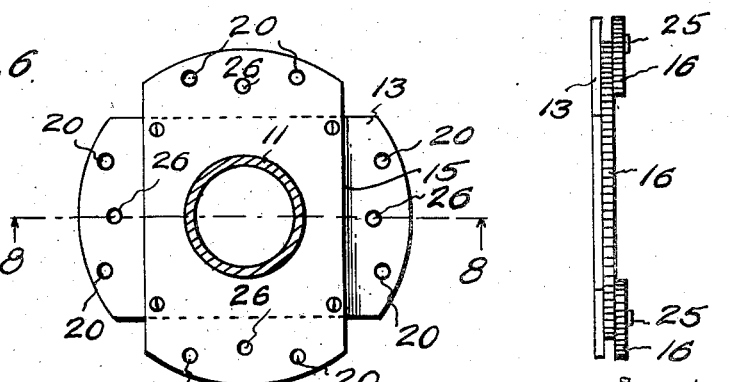
Inventor
FRANK G. ROSENE Nov. 23, 1948.   F. G. ROSENE   2,454,407
NONSKID DEVICE
Filed May 11, 1945   3 Sheets-Sheet 2
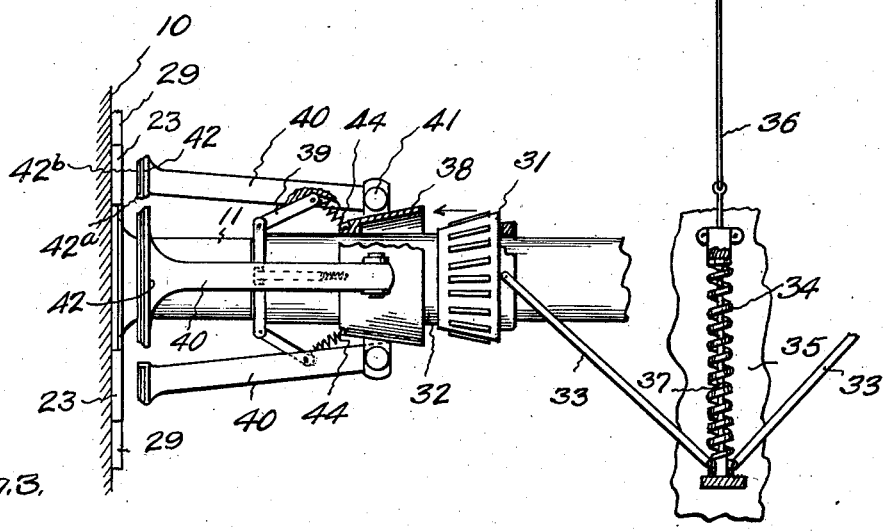
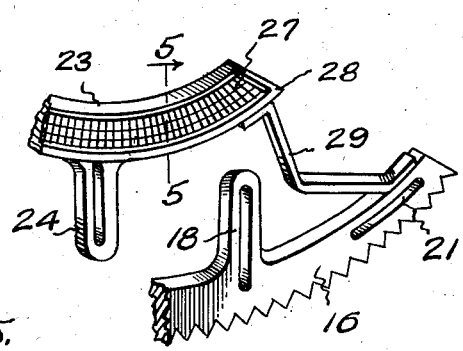
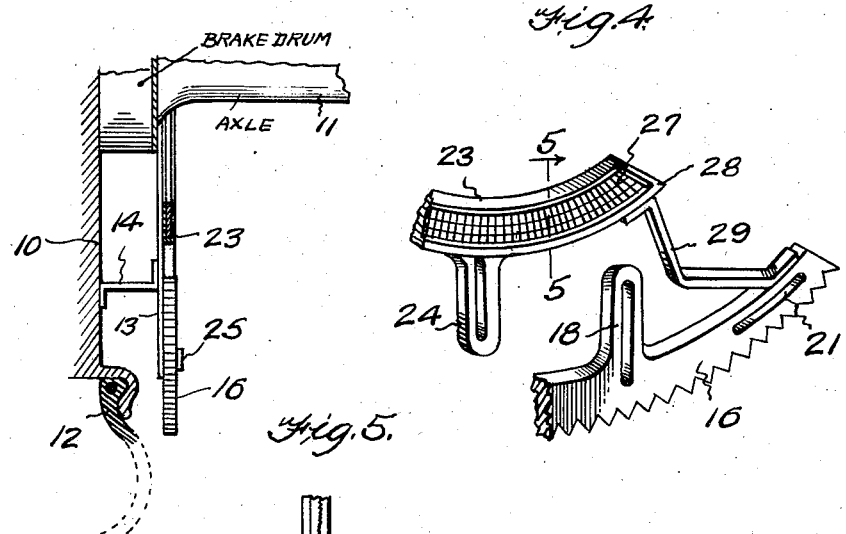
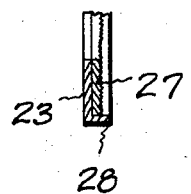
Inventor
FRANK G. ROSENE
By
Attorney Nov. 23, 1948.  F. G. ROSENE  2,454,407
NONSKID DEVICE Filed May 11, 1945  3 Sheets-Sheet 3

Inventor
FRANK G. ROSENE
By Christy, Parmelee & Strickland
Attorneys

Patented Nov. 23, 1948

2,454,407

UNITED STATES PATENT OFFICE 2,454,407

NONSKID DEVICE

Frank G. Rosene, Pittsburgh, Pa.

Application May 11, 1945, Serial No. 593,126

11 Claims. (Cl. 301—47)

This invention relates to a non-skid device for automobiles and other vehicles, and has for one of its objects the production of a simple and efficient surface-gripping mechanism which is carried by the wheels of a vehicle, which mechanism may be readily moved to a surface gripping position as well as to a retracted position while the vehicle is in motion.

A further object of this invention is the production of a simple and efficient actuating mechanism for moving the surface-gripping elements to and from an operative position.

Other objects and advantages of the present invention will appear throughout the following specification and claims.

In the drawings:

Figure 1 is a side elevational view of the surface-gripping mechanism carried by a wheel, the supporting axle being shown in transverse section;

Figure 2 is a side elevational view of the actuating clutch mechanism for moving the surface-gripping mechanism to an operative position;

Figure 3 is a fragmentary sectional view of a portion of a wheel showing the gripping mechanism partly in edge elevation and partly in section;

Figure 4 is a fragmentary perspective view of a portion of one gripping segment and one clutch segment;

Figure 5 is a transverse sectional view taken on line 5—5 of Figure 4;

Figure 6 is a plan view of the supporting plates which attach the gripping mechanism to the wheel, the axle casing being shown in section;

Figure 7 is an edge elevational view of the gripping members assembled with the supporting plates shown in Figure 6;

Figure 8 is a sectional view taken on line 8—8 of Figure 6, showing the plates removed from the axle.

Figure 9:
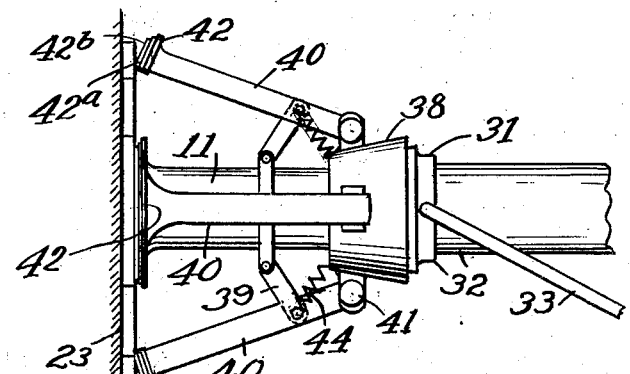
Fig. 9 is an enlarged fragmentary side elevational view similar to Fig. 2 except showing the actuating clutch mechanism in an intermediate position.

By referring to the drawings, it will be seen that 10 designates the wheel upon which the surface-gripping mechanism is mounted, and which is supported by the conventional axle 11.

The conventional tire 12 is carried by the wheel 10.

A pair of cross plates 13 are rotatably mounted on the casing of the axle 11 and are anchored and secured to the inner face of the wheel 10 by suitable brackets 14. One of the plates 13 is provided with an inset portion 15 within which the other plate rests to extend cross-wise in flush relation, as shown in Figures 6 and 8.

A surface-gripping segment 16 is carried by each end of each plate 13 and comprises a toothed outer periphery 17 which is arranged on the arc of a circle approximately that of the periphery of the tire 12, as shown in Figure 1. Each segment 16 is provided wtih inwardly extending slotted fingers 18 through which slotted fingers pass the anchoring pins or bolts 19 which also pass through the apertures 20 of the plates 13 for securing the segments 16 to the plates 13 and wheel 10 and permitting the segments 16 to be radially adjusted upon the wheel 10. The segments 16 are preferably four in number, and when in a retracted position the ends 21 thereof overlap as shown in Figure 1. These overlapping ends 21 are slotted and are held against relative lateral displacement by means of securing bolts 22 which work in the slots in the ends of the segments, permitting at the same time the radial shifting of the segments. These slots and connection means may be of any suitable type without departing from the spirit of the invention to permit the segments to be properly shifted to and from an operative position.

A plurality of clutch segments 23 are arranged around the axle 11, and are preferably four in number, so constructed as to constitute a circle when the segments 23 are in a retracted position. Each segment 23 is provided with a slotted finger 24 which is anchored to one of the plates 13 by means of an anchoring pin or bolt 25 passing through a suitable aperture 26. A suitable friction plate 27, such as a brake lining, is carried by each segment 23 and is provided with a roughened friction face as shown. The segments 23 are preferably provided with retaining flanges 28 extending around the ends and outer edges of the segments, as shown.

Substantially V-shaped spacing spring arms 29 connect the ends of the gripping segments with the ends of the companion clutch segments as shown in Figure 1, to provide a yieldable connection between these elements. Coil springs 30 are secured to the segments 16 and to the plates 13 to normally pull the segments 16 to a retracted position when expanding pressure caused by the operating mechanism which is exerted upon the clutch segments is released.

Figure 10:
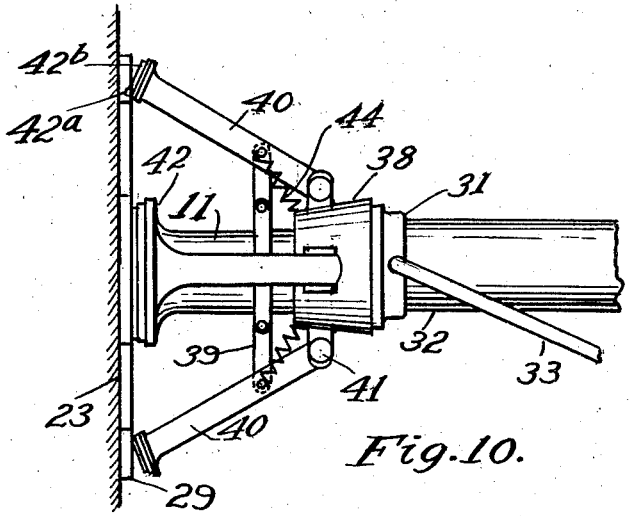
Fig. 10 is an enlarged fragmentary side elevational view similar to Fig. 2 except that the actuating clutch mechanism and surface-gripping mechanism are shown in the operative position.

The actuating mechanism comprises a roller-bearing clutch member 31 which is slidable upon the sleeve 32. This sleeve 32 is carried by the axle housing or casing of the axle 11. The roller-bearing clutch member 31 is slidable longitudinally of the sleeve 32 and is actuated by the link 33 which in turn is connected to the spring-pressed actuating rod 34 carried by the support 35 mounted at a suitable location upon the vehicle. A pull cable 36 is secured to the rod 34 and may extend to a suitable point for convenient operation by an operator. A spring 37 is adapted to return the rod 34 to an inactive position when released. The roller-bearing clutch member 31 is adapted to fit into the female member 38 of the clutch moving in the direction of the arrow, to actuate the device when the cable 36 is pulled by the operator. Links 39 are pivoted on the sleeve 32 and are also pivoted to the clutch arms 40, which clutch arms 40 are pivoted at their inner ends, as at 41, to the female clutch member 38. As the member 38 is moved toward the wheel 10 by a continuous pull upon the cable 36, the links 39 will cause the shoes 42 of the arms 40 to contact the clutch segments 23, and by a further continuous pull upon the cable 36, the clutch segments 23 will be moved radially outwardly as shown more clearly in Figs. 9 and 10. Brake lining 42$^b$ coming in contact with plate 27 will force the segment (see Fig. 4) in the same direction to the limit of movement of arm 39. This movement will also move the gripping segments 16 outwardly toward the periphery of the tire 12 and into engagement with the road surface, thereby preventing skidding. When the cable 36 is released, the spring 37 will return the rod 34 and clutch member 31 to their retracted position, relieving pressure from the member 38. The springs 44 which engage the arms 40 and links 39 will pull the arms 40 toward the axle 11 and cause the clutch member 38 to slide to its retracted or inactive position.

As shown in Figure 2, each shoe 42 is provided with an inner flange 42$^a$ against which the edge of the friction plate or strip, such as a brake lining 42$^b$ abuts, in a similar manner to the elements 27 and 28 shown in Figure 5.

Having described the invention, what is claimed as new is:

1. In combination with a wheel, an axle supporting said wheel, a surface-gripping mechanism supported adjacent said wheel, said gripping mechanism comprising a plurality of segments movable radially of the wheel to and from a surface-gripping position, a clutch element resiliently connected to each segment, means movable into engagement with said clutch element for moving said surface-gripping segments to a surface-gripping position, a supporting member carried by said axle, guiding means carried by each segment, and means carried by said supporting member and engaging the guiding means of said segments for connecting the segments to said supporting member.

2. In combination with a wheel, an axle supporting said wheel, a surface-gripping mechanism supported adjacent said wheel, said gripping mechanism comprising a plurality of segments movable towards and away from the periphery of the wheel to and from a surface-gripping position, a clutch element resiliently connected to each segment, means movable into engagement with said clutch element for moving said surface-gripping segments to a surface-gripping position, a supporting member carried by said axle, a plurality of slotted fingers carried by each segment, and means secured to said supporting member and passing through said slotted fingers for connecting the segments to said supporting member.

3. In combination with a wheel, an axle supporting said wheel, a surface-gripping mechanism supported adjacent said wheel, said gripping mechanism comprising a plurality of segments movable towards and away from the periphery of the wheel to and from a surface-gripping position, a clutch element resiliently connected to each segment, means movable into engagement with said clutch element for moving said surface-gripping segments to a surface-gripping position, a supporting member carried by said axle, guiding means carried by each segment, means carried by said supporting member and engaging the guiding means of said segments for connecting the segments to said supporting member, retractible means connected to said supporting member and to said segments for automatically retracting the segments to an inoperative position.

4. In combination with a wheel, an axle supporting said wheel, a surface-gripping mechanism supported adjacent said wheel, said gripping mechanism comprising a plurality of segments movable radially of the wheel to and from a surface-gripping position, a clutch element resiliently connected to each segment, means movable away from the axle into engagement with said clutch element for moving said surface-gripping segments to a surface-gripping position, a supporting member carried by said axle, guiding means carried by each segment, means carried by said supporting member and engaging the guiding means of said segments for connecting the segments to said supporting member, the segments having overlapping ends, and means for slidably connecting the overlapping ends of the segments.

5. In combination with a wheel, an axle supporting said wheel, a surface-gripping mechanism supported adjacent said wheel, said gripping mechanism comprising a plurality of segments movable radially of the wheel to and from a surface-gripping position, a clutch element resiliently connected to each segment, means movable away from the axle into engagement with said clutch element for moving said surface-gripping segments to a surface-gripping position, a supporting member carried by said axle, guiding means carried by each segment, means carried by said supporting member and engaging the guiding means of said segments for connecting the segments to said supporting member, spring means connecting the clutch elements to the segments for providing a yieldable connection therebetween, and guiding means connecting the clutch elements with said supporting member.

6. In combination with a wheel, a surface-gripping mechanism supported adjacent said wheel, an axle supporting said wheel, said gripping mechanism comprising a plurality of friction segments movable radially of the wheel to and from a surface-gripping position, a clutch element resiliently connected to each segment, means movable into engagement with said clutch element for moving said surface-gripping segments to a surface-gripping position, a supporting member carried by said axle, guiding means carried by each segment, means carried by said supporting member and engaging the guiding means of said segments for connecting the segments to said supporting member, spring means connecting the clutch elements to the segments for providing a yieldable connection therebetween, guiding means connecting the clutch elements with said supporting member, each clutch element having a friction plate upon one face thereof and engageable with said last-mentioned means.

7. In combination with a wheel, an axle supporting the wheel, a surface-gripping mechanism rotatably and resiliently supported by and movable toward and away from said axle and toward and away from the periphery of said wheel, an actuating mechanism slidably mounted upon said axle toward and away from said wheel, and means carried by said actuating mechanism and movable away from the axle to an operative position to move said surface-gripping mechanism to an active position.

8. In combination with a wheel, an axle supporting said wheel, a surface-gripping mechanism rotatably and resiliently supported by and movable radially to and from a surface-gripping position, a clutch means carried by said surface-gripping mechanism, an actuating mechanism slidably mounted upon said axle, said actuating mechanism comprising a plurality of clutch arms mounted to swing toward and away from said axle and movable into and out of engagement with said clutch means, means for automatically retracting said clutch arms when released, and means for moving said arms to a gripping position.

9. In combination with a wheel, an axle supporting said wheel, a surface-gripping mechanism movable radially to and from a surface-gripping position, a clutch means carried by said surface-gripping mechanism, an actuating mechanism slidably mounted upon said axle, said actuating mechanism comprising a plurality of clutch arms mounted to swing toward and away from said axle and movable into and out of engagement with said clutch means, means for automatically retracting said clutch arms when released, a roller bearing clutch member shiftable longitudinally of the axle and movable to and from an actuating position to swing said arms to an engaging position, and a remotely-controlled operating means for shifting said roller bearing clutch member.

10. In combination with a wheel, an axle supporting said wheel, a surface-gripping mechanism movable radially to and from a surface-gripping position, a clutch means carried by said surface-gripping mechanism, an actuating mechanism slidably mounted upon said axle, said actuating mechanism comprising a plurality of clutch arms mounted to swing toward and away from said axle and movable into and out of engagement with said clutch means, means for automatically retracting said clutch arms when released, a roller bearing clutch member shiftable longitudinally of the axle and movable to and from an actuating position to swing said arms to an engaging position, a remotely-controlled operating means for shifting said roller bearing clutch member, supporting means for retracting said arms when said arms are released, and a female clutch element adapted to receive the roller bearing clutch member and pivotally supporting said arms and adapted to swing said arms when said roller bearing clutch member engages said female clutch element.

11. In combination with a wheel rotatably supported on an axle, a surface gripping mechanism including a plurality of surface gripping segments arranged about a circle adjacent the wheel periphery with their ends in overlapping relationship, a plurality of clutch segments, a plurality of substantially radially extending spring elements whose opposite ends are connected to said clutch segments and said surface gripping segments, respectively, at peripherally spaced points, there being a plurality of spring elements connecting each clutch segment and its corresponding surface gripping segment, and spring biased operating means including a plurality of clutch operating elements movable away from the axle into engagement with said clutch segments for moving said surface gripping elements radially outwardly into engagement with a roadway surface.

FRANK G. ROSENE.

REFERENCES CITED

The following references are of record in the file of this patent:

UNITED STATES PATENTS

| Number | Name | Date |
|---|---|---|
| 774,246 | Herrick | Nov. 8, 1904 |
| 1,219,718 | Franz | Mar. 20, 1917 |
| 1,404,767 | Henry | Jan. 31, 1922 |
| 1,439,931 | Warner et al. | Dec. 26, 1922 |
| 2,079,501 | Gallagher et al. | May 4, 1937 |

FOREIGN PATENTS

| Number | Country | Date |
|---|---|---|
| 679,104 | Germany | July 28, 1939 |